United States Patent
Lin et al.

(10) Patent No.: US 10,037,110 B2
(45) Date of Patent: Jul. 31, 2018

(54) TOUCH PANEL

(71) Applicant: TPK Touch Solutions (Xiamen) Inc., Xiamen (CN)

(72) Inventors: Chun-Chi Lin, Taipei (TW); Chien-Min Lai, New Taipei (TW)

(*) Notice: Subject to any disclaimer, the term of this patent is extended or adjusted under 35 U.S.C. 154(b) by 298 days.

(21) Appl. No.: 14/841,657

(22) Filed: Aug. 31, 2015

(65) Prior Publication Data

US 2017/0060294 A1   Mar. 2, 2017

(30) Foreign Application Priority Data

Oct. 21, 2014 (CN) .......................... 2014 1 0562476

(51) Int. Cl.
*G06F 3/044* (2006.01)

(52) U.S. Cl.
CPC .... *G06F 3/044* (2013.01); *G06F 2203/04112* (2013.01)

(58) Field of Classification Search
CPC ....................................................... G06F 3/044
USPC ............................................................ 345/174
See application file for complete search history.

(56) References Cited

U.S. PATENT DOCUMENTS

| 9,372,359 | B2* | 6/2016 | Nagami | G02F 1/13338 |
| 2009/0309843 | A1* | 12/2009 | Kim | G06F 3/0414 345/173 |
| 2010/0026655 | A1* | 2/2010 | Harley | G06F 3/044 345/174 |
| 2012/0044193 | A1* | 2/2012 | Peng | G06F 3/044 345/174 |
| 2016/0011694 | A1* | 1/2016 | Lin | G06F 3/044 345/174 |

* cited by examiner

*Primary Examiner* — Jason C Olson

(57) ABSTRACT

A touch panel includes a first transparent conductive wire and a second transparent conductive wire. The first transparent conductive wire is of a first conductive layer and the second transparent conductive wire is of a second conductive layer. The first transparent conductive wire includes a first conductive portion parallel to a first axis and a second conductive portion parallel to a second axis, wherein the first transparent conductive portion and the second transparent conductive portion commonly have a first overlapping area. The second transparent conductive wire includes a third conductive portion parallel to the first axis and a fourth conductive portion parallel to the second axis, wherein the third transparent conductive portion and the fourth transparent conductive portion commonly have a second overlapping area. The projection centroid of the first overlapping area is not in the same position as the projection centroid of the second overlapping area.

13 Claims, 6 Drawing Sheets

TOUCH PANEL

BACKGROUND OF THE INVENTION

This non-provisional application claims priority under 35 U.S.C. § 119(a) on Patent Application No. CN201410562476.4 filed in China on Oct. 21, 2014, the entire contents of which are hereby incorporated by reference.

TECHNICAL FIELD

The disclosure relates to touch panels, and more particularly to dual conductive-layer touch panels.

DESCRIPTION OF THE RELATED ART

Using a touch panel as an input interface is commonly applied to various electronic products nowadays, wherein the projective capacitive touch panel becomes the mainstream product because of its high accuracy and sensitivity. One of structures of the mainstream touch panel is the dual ITO touch panel, but the accuracy and sensitivity of the dual ITO touch panel is limited by the coupled capacitance of the overlapping part of the two conductive wires. Therefore, how to increase the sensitivity of the dual ITO touch panel is an urgent problem to be solved.

SUMMARY OF THE INVENTION

Owing to the aforementioned problem, the disclosure provides a touch panel with a new mesh (palisade) conductive wire to reduce the ratio of the overlapping part between the two layers of the conductive wires. Therefore, the accuracy and sensitivity of the touch panel is increased.

According to one or more embodiments of the disclosure, a touch panel includes a first transparent conductive wire and a second transparent conductive wire. The first transparent conductive wire is disposed in a first conductive layer, and the second transparent conductive wire is disposed in a second conductive layer, and the second conductive layer is disposed above the first conductive layer. The first transparent conductive wire includes a first conductive portion parallel to a first axis and a second conductive portion parallel to a second axis, and the first conductive portion and the second conductive portion intersect in a first overlapping area. The second transparent conductive wire includes a third conductive portion parallel to the first axis and a fourth conductive portion parallel to the second axis, and the third conductive portion and the fourth conductive portion intersect in a second overlapping area. The projection centroid of the first overlapping area is not in the same position as the projection centroid of the second overlapping area.

According to some other embodiments of the disclosure, a touch panel includes a plurality of first transparent conductive wires and a plurality of second transparent conductive wires. The plurality of first transparent conductive wires is disposed in a first conductive layer and parallel to a first axis. Each of the first transparent conductive wires includes a plurality of first sub conductive wires parallel to a second axis and a plurality of second sub conductive wires parallel to the first axis, and the plurality of first sub conductive wires and the plurality of second sub conductive wires intersect in a plurality of overlapping areas. The plurality of second transparent conductive wires are disposed in a second conductive layer and parallel to the second axis, and the second conductive layer is disposed above the first conductive layer, and each of the second transparent conductive wires has a plurality of hollow areas. The projection centroids of the overlapping areas are in the same position as part of the projection centroids of the hollow areas.

BRIEF DESCRIPTION OF THE DRAWINGS

The disclosure will become more fully understood from the detailed description given herein below and the accompanying drawings, which are given by way of illustration only and thus are not limitative of the disclosure and wherein.

DETAILED DESCRIPTION OF THE INVENTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 1:
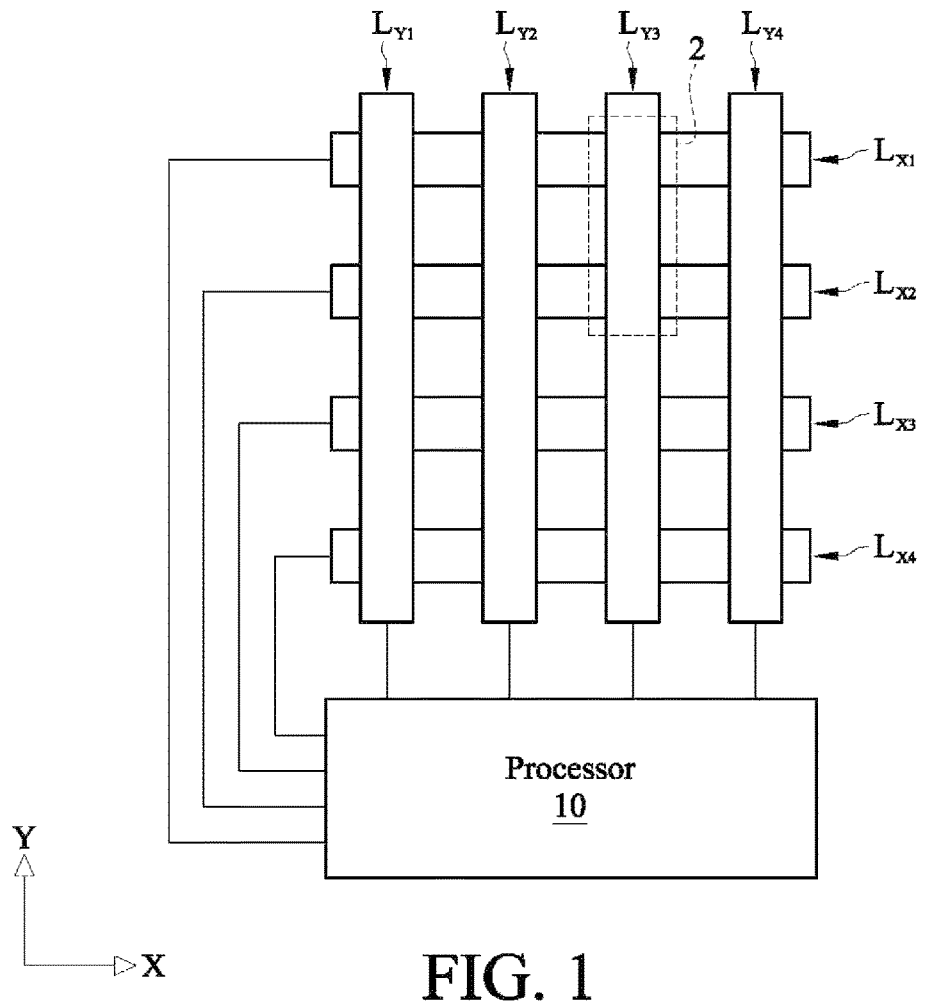
FIG. 1 is a top view of the wiring layout of the touch panel according to at least one embodiment of the disclosure.
Figure 2:
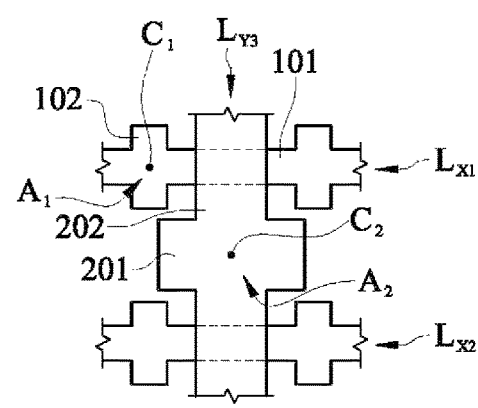
FIG. 2 is a partial enlargement diagram of the wiring layout of the touch panel according to at least one embodiment of the disclosure.

Please refer to FIG. 1 and FIG. 2 together. FIG. 1 is a top view of a wiring layout of a touch panel according to one or more embodiments of the disclosure. FIG. 2 is a partial enlargement diagram of the wiring layout of the touch panel according to one or more embodiments of the disclosure. As shown in FIG. 1, touch panel 1 includes a plurality of first transparent conductive wires $L_{X1}$ to $L_{X4}$ and a plurality of second transparent conductive wires $L_{Y1}$ to $L_{Y4}$, and the first transparent conductive wires $L_{X1}$ to $L_{X4}$ and the second transparent conductive wires $L_{Y1}$ to $L_{Y4}$ are respectively electrically connected with a processor 10. The plurality of first transparent conductive wires $L_{X1}$ to $L_{X4}$ are disposed in a first conductive layer and the plurality of second transparent conductive wires $L_{Y1}$ to $L_{Y4}$ are disposed in a second conductive layer. From a perspective of a cross-sectional view, the second conductive layer is disposed above the first conductive layer. All first transparent conductive wires $L_{X1}$ to $L_{X4}$ are electrically insulated from all second transparent conductive wires $L_{Y1}$ to $L_{Y4}$. A coupled capacitor exists between each pair of one first transparent conductive wire $L_{X1}$ to $L_{X4}$ and one second transparent conductive wire $L_{Y1}$ to $L_{Y4}$ (such as between the first transparent conductive wire $L_{X1}$ and the second transparent conductive wire $L_{Y1}$) instead of being directly electrically connected. In some embodiments, the material of the transparent conductive wire is a metal oxide, such as indium tin oxide (ITO), indium zinc oxide (IZO), cadmium tin oxide (CTO), aluminum zinc oxide (AZO), zinc oxide, or any other conductive material with high transparency, without limitation thereto.

FIG. 2 is an enlargement of the region 2 in FIG. 1. The first transparent conductive wire $L_{X1}$ includes a first conductive portion 101 parallel to a first axis, that is, axis X, and a second conductive portion 102 parallel to a second axis, that is, axis Y, and the second conductive portion 102 and the first conductive portion 101 intersect in a first overlapping area $A_1$. The second transparent conductive wire $L_{Y3}$ includes a third conductive portion 201 parallel to the first axis and a fourth conductive portion 202 parallel to the second axis, and the fourth conductive portion 202 and the third conductive portion 201 intersect in a second overlapping area $A_2$. The projection centroid $C_1$ of the first overlapping area $A_1$ is not in the same position as the projection centroid $C_2$ of the second overlapping area $A_2$.

Figure 3:
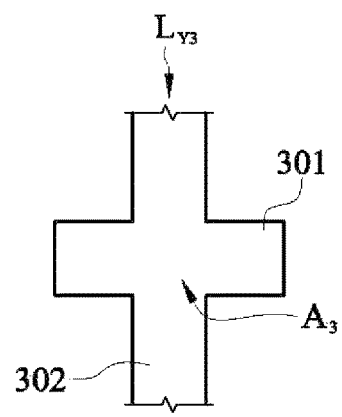
FIG. 3 is a partial diagram of the second transparent conductive wire according to at least one embodiment of the disclosure.
Figure 4:
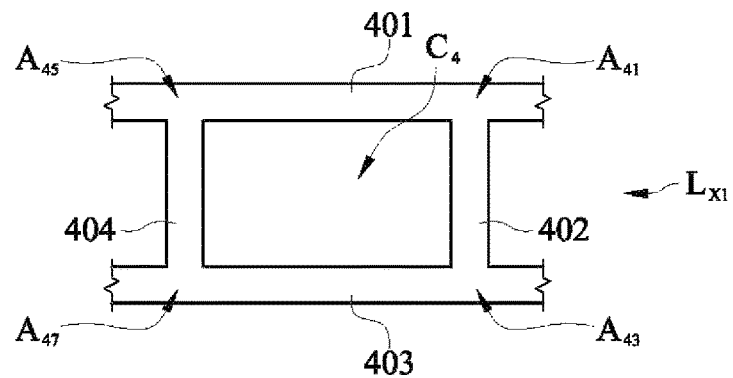
FIG. 4 is a partial diagram of the first transparent conductive wire according to at least one embodiment of the disclosure.
Figure 5:
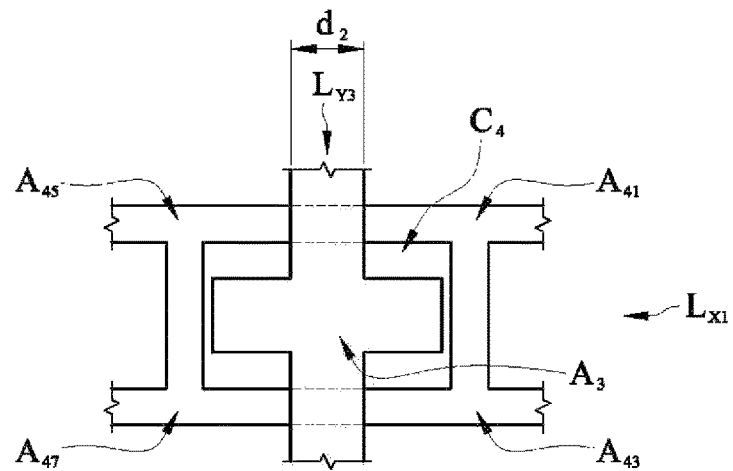
FIG. 5 is a partial diagram of the layout of the transparent conductive wire according to at least one embodiment of the disclosure.

FIG. 3 is a partial diagram of the second transparent conductive wire $L_{Y3}$ according to one or more embodiments of the disclosure. FIG. 4 is a partial diagram of the first transparent conductive wire $L_{X1}$ according to one or more embodiments of the disclosure. FIG. 5 is a partial diagram of the layout of the transparent conductive wire $L_{Y3}$, $L_{X1}$ according to one or more embodiments of the disclosure. As shown in FIG. 3 and FIG. 4, the first transparent conductive wire $L_{X1}$ includes a first conductive portion 401 parallel to the first axis, a second conductive portion 402 parallel to the second axis, a fifth conductive portion 403 parallel to the first axis, and a sixth conductive portion 404 parallel to the second axis. The second transparent conductive wire $L_{Y3}$ includes a third conductive portion 301 parallel to the first axis and a fourth conductive portion 302 parallel to the second axis. The third conductive portion 301 and the fourth conductive portion 302 intersect in a third overlapping area $A_3$. The first conductive portion 401 and the second conductive portion 402 intersect in a first overlapping area $A_{41}$. The fifth conductive portion 403 and the second conductive portion 402 intersect in a third overlapping area $A_{43}$. The first conductive portion 401 and the sixth conductive portion 404 intersect in a fourth overlapping area $A_{45}$. The fifth conductive portion 403 and the sixth conductive portion 404 intersect in a fifth overlapping area $A_{47}$. The combined disposal of the first transparent conductive wire $L_{X1}$ and the second transparent conductive wire $L_{Y3}$ in the touch panel 1 is shown in FIG. 5. As shown in FIG. 5, the projection of the second overlapping area A3 does not overlapping with the four overlapping areas, such as the first overlapping area $A_{41}$, the third overlapping area $A_{43}$, the fourth overlapping area $A_{45}$, and the fifth overlapping area $A_{47}$. In other words, the projection centroid of the second overlapping area $A_3$ is different from the projection centroids of the other four overlapping areas $A_{41}$, $A_{43}$, $A_{45}$, $A_{47}$.

Figure 6:
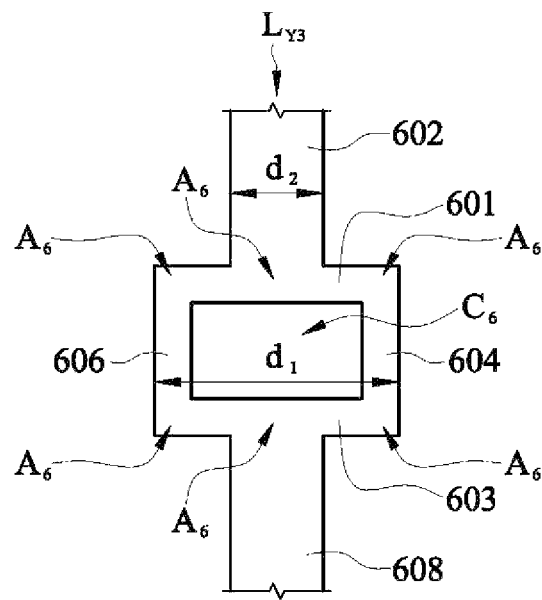
FIG. 6 is a partial diagram of the second transparent conductive wire according to at least one embodiment of the disclosure.
Figure 7:
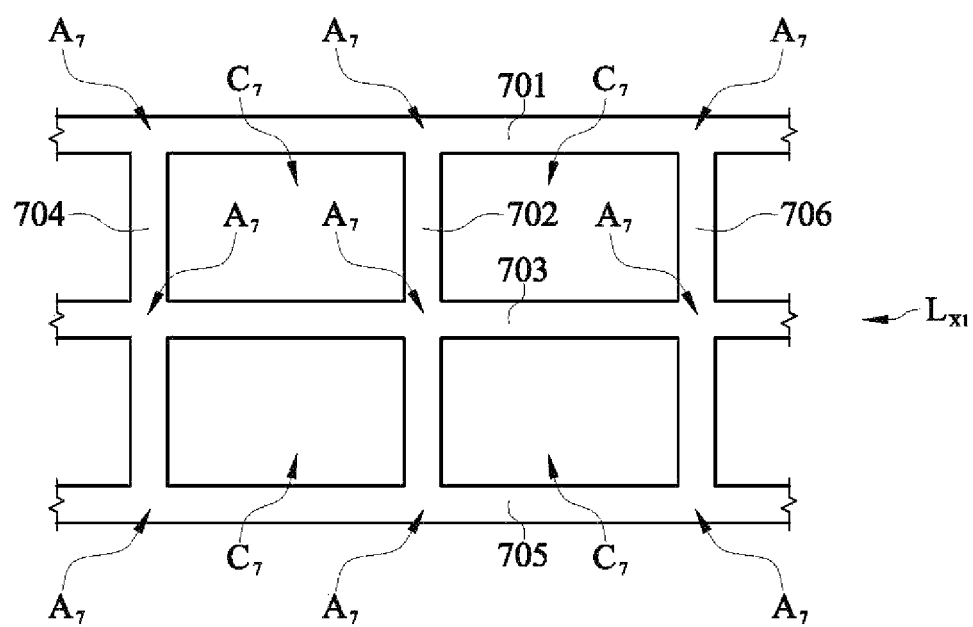
FIG. 7 is a partial diagram of the first transparent conductive wire according to at least one embodiment of the disclosure.
Figure 8:
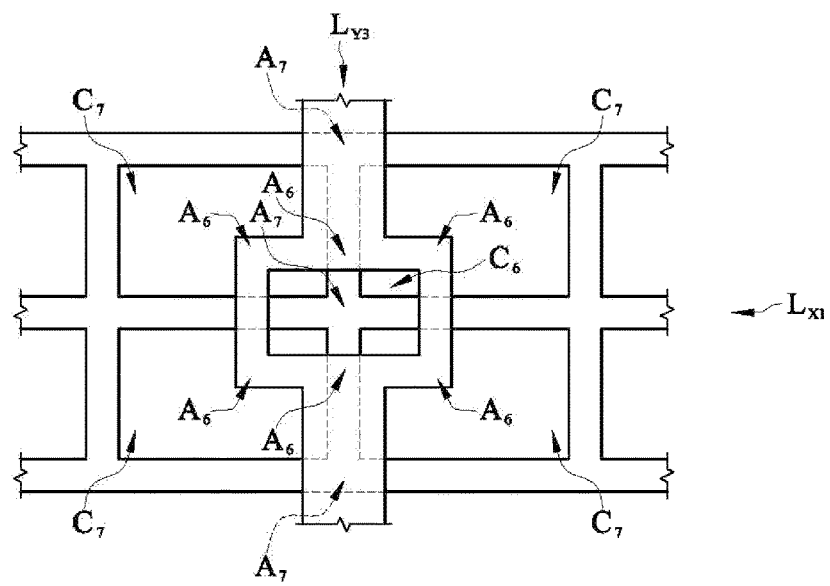
FIG. 8 is a partial diagram of the layout of the transparent conductive wire according to at least one embodiment of the disclosure.
Figure 9:
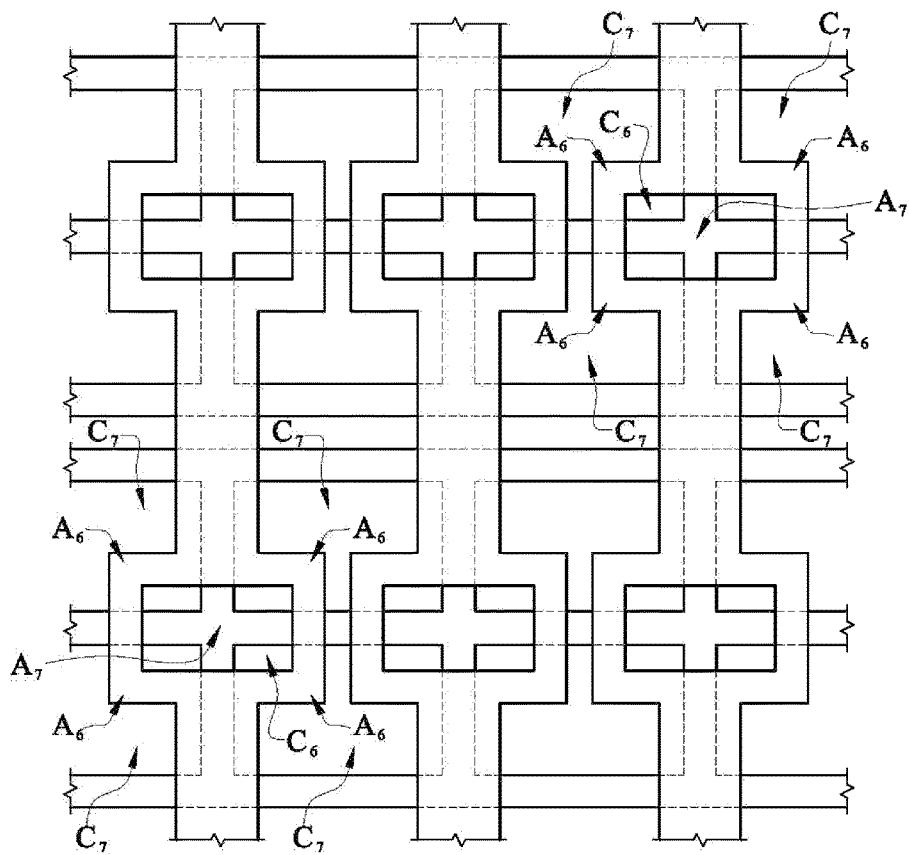
FIG. 9 is a partial diagram of the layout of multiple transparent conductive wires according to at least one embodiment of the disclosure.

FIG. 6 is a partial diagram of the second transparent conductive wire $L_{Y3}$ according to one or more embodiments of the disclosure. FIG. 7 is a partial diagram of the first transparent conductive wire $L_{X1}$ according to one or more embodiments of the disclosure. FIG. 8 is a partial diagram of the layout of the transparent conductive wires $L_{X1}$, $L_{Y3}$ according to one or more embodiments of the disclosure. As shown in FIG. 6 and FIG. 7, the first transparent conductive wire $L_{X1}$ includes a conductive portion 701, a conductive portion 703, and a conductive portion 705 parallel to the first axis, and a conductive portion 702, a conductive portion 704, and a conductive portion 706 parallel to the second axis. The conductive portion 702, the conductive portion 704, and the conductive portion 706 and the conductive portion 701, conductive portion 703, and the conductive portion 705 respectively intersect in a plurality of first overlapping areas $A_7$. The second transparent conductive wire $L_{Y3}$ includes a conductive portion 601 and a conductive portion 603 parallel to the first axis, and a conductive portion 602, a conductive portion 604, a conductive portion 606 and a conductive portion 608 parallel to the second axis. The conductive portions of the second transparent conductive wire $L_{Y3}$ intersect in a plurality of second overlapping areas $A_6$. The combined disposal of the first transparent conductive wire $L_{X1}$ and the second transparent conductive wire $L_{Y3}$ in the touch panel 1 is shown in FIG. 8. As shown in FIG. 8, the projections of the plurality of first overlapping areas $A_7$ do not overlap any of the second overlapping areas $A_6$. In other words, the projection centroid of any second overlapping area $A_6$ is different from the projection centroid of any first overlapping area $A_7$. Detailed structure of the combined disposal of the plurality of first transparent conductive wires and the plurality of second transparent conductive wires of FIG. 1 is shown in FIG. 9. FIG. 9 is a partial diagram of the layout of multiple transparent conductive wires according to one or more embodiments of the disclosure. As shown in FIG. 9, projections of the plurality of first overlapping areas $A_7$ overlap projections of the hollow areas $C_6$ and projections of the plurality of second overlapping areas $A_6$ overlap projections of the hollow areas $C_7$.

From another point of view, a plurality of sub conductive wires, namely, the conductive portions 701-706, of the first transparent conductive wire $L_{X1}$ intersect with each other and form a plurality of overlapping areas, such as the plurality of first overlapping areas $A_7$ in FIG. 7, and the second transparent conductive wire $L_{Y3}$ has a plurality of hollow areas, and each of the plurality of hollow areas is surrounded by a plurality of conductive portions. For example, the second transparent conductive wire $L_{Y3}$ has a hollow area $C_6$ shown in FIG. 6, and the hollow area $C_6$ is surrounded by a plurality of conductive portions 601, 604, 606, 603. As shown in FIG. 8, at least part of the projection of the plurality of second overlapping areas $A_6$ overlaps projections of hollow areas $C_7$, and the projection of one of the first overlapping areas $A_7$ overlaps the projection of the hollow area $C_6$.

In addition, as shown in FIG. 6, the second transparent conductive wire $L_{Y3}$ has a first wire width $d_1$ and a second wire width $d_2$, and the first wire width $d_1$ is larger than the second wire width $d_2$. The hollow area $C_6$ is exactly corresponding to the part of the second transparent conductive wire $L_{Y3}$ with the first wire width $d_1$.

Figure 10:
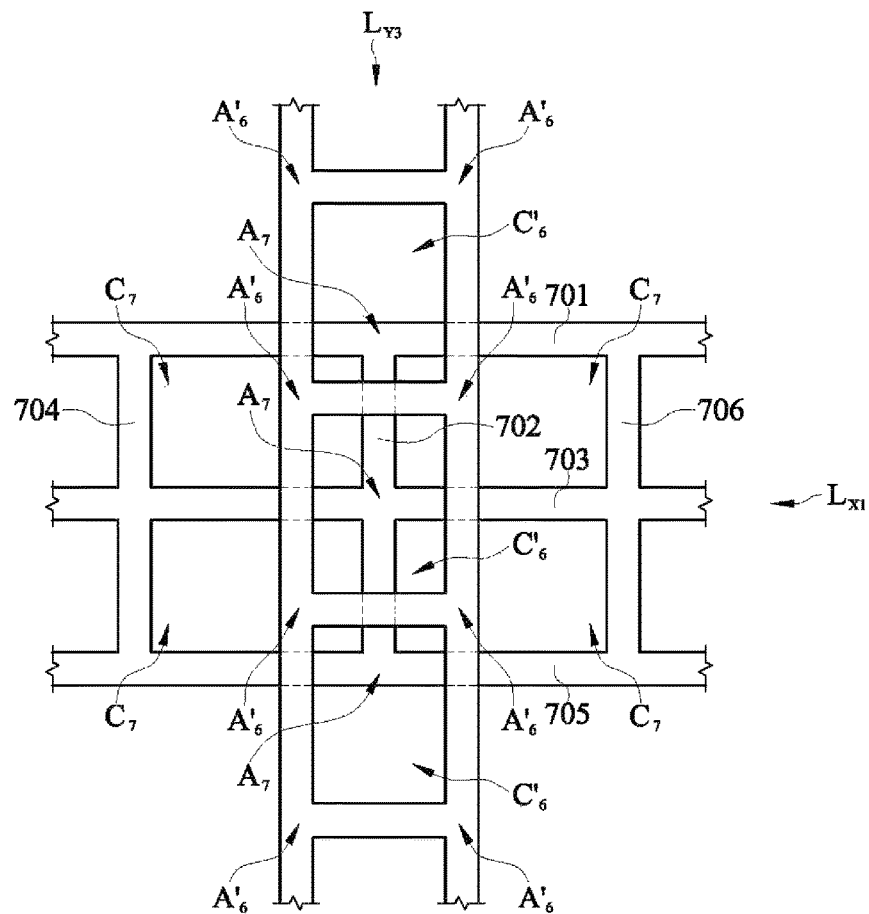
FIG. 10 is a partial diagram of the layout of the transparent conductive wire according to at least one embodiment of the disclosure.

FIG. 10 is a partial diagram of a layout of the transparent conductive wire $L_{X1}$, $L_{Y3}$ according to one or more embodiments of the disclosure. As shown in FIG. 10, the first transparent conductive wire $L_{X1}$ is parallel to the first axis, and the second transparent conductive wire $L_{Y3}$ is parallel to the second axis. The first transparent conductive wire $L_{X1}$ has a plurality of first sub conductive wires, such as conductive portion 702, 704, 706, parallel to the second axis and a plurality of second sub conductive wires, such as conductive portion 701, 703, 705, parallel to the first axis. The first and second sub conductive wires intersect each other in a plurality of overlapping areas $A_7$. The second transparent conductive wire $L_{Y3}$ has a plurality of hollow areas $C'_6$. A plurality of overlapping areas $A'_6$ on the second transparent conductive wire $L_{Y3}$ correspond to the plurality of hollow areas $C_7$ on the first transparent conductive wire $L_{X1}$, and the projection centroid of at least part of the overlapping area $A_7$ overlaps the projection centroid of part of the hollow areas $C'_6$. In some embodiments, the projection centroid of each overlapping area of the first transparent conductive wire overlaps the projection centroid of one of the hollow areas of the second transparent conductive wire.

Figure 11:
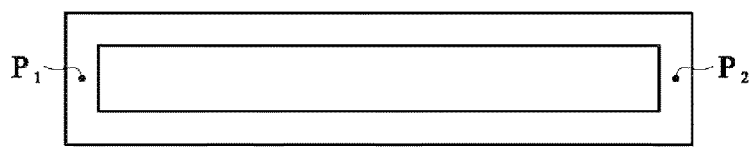
FIG. 11 is a diagram of the layout of a normal conductive wire.
Figure 12:
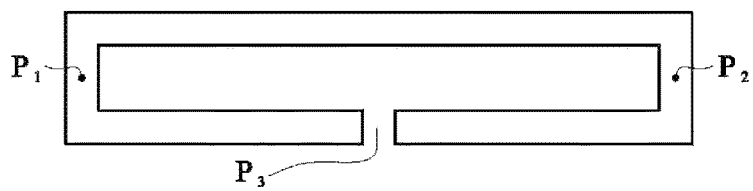
FIG. 12 is a diagram of a normal conductive wire with a breaking point.

Please refer to FIG. 11 and FIG. 12. FIG. 11 is a diagram of the layout of a normal conductive wire. FIG. 12 is a diagram of a normal conductive wire with a breaking point. As shown in FIG. 11, normally the resistance value of a point $P_1$ to another point $P_2$ on a normal conductive wire is $R_1$. As shown in FIG. 12, once a break occurs on $P_3$, the resistance value of the point $P_1$ to the point $P_2$ is highly increased. In other words, the wire impedance of the touch panel is significantly changed, and this kind of variation usually affects the accuracy and sensitivity of the capacitive touch panel.

Figure 13:
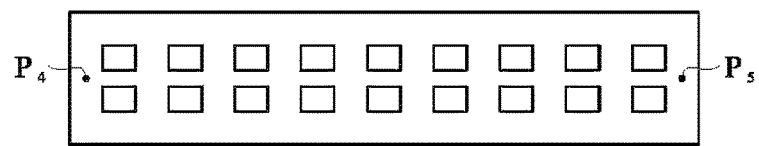
FIG. 13 is a structural diagram of a conductive wire according to at least one embodiment of the disclosure.
Figure 14:
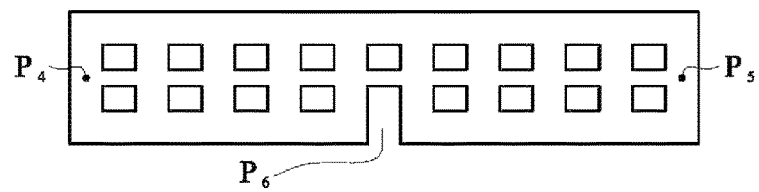
FIG. 14 is a diagram of a conductive wire with a break according to at least one embodiment of the disclosure.

Please refer to FIG. 13 and FIG. 14 for the structure of the transparent conductive wire shown in FIG. 7. FIG. 13 is a structural diagram of a conductive wire according to one or more embodiments of the disclosure. FIG. 14 is a diagram of a conductive wire with a break according to one or more embodiments of the disclosure. As shown in FIG. 13, when the whole conductive wire does not have any breaks, the resistance value of the point $P_4$ to point $P_5$ is $R_2$. As shown in FIG. 14, when the conductive wire has a break in the point $P_6$, the resistance value of the point $P_4$ to point $P_5$ still approximates to $R_2$, and the value is increased slightly but not obviously.

Figure 15:
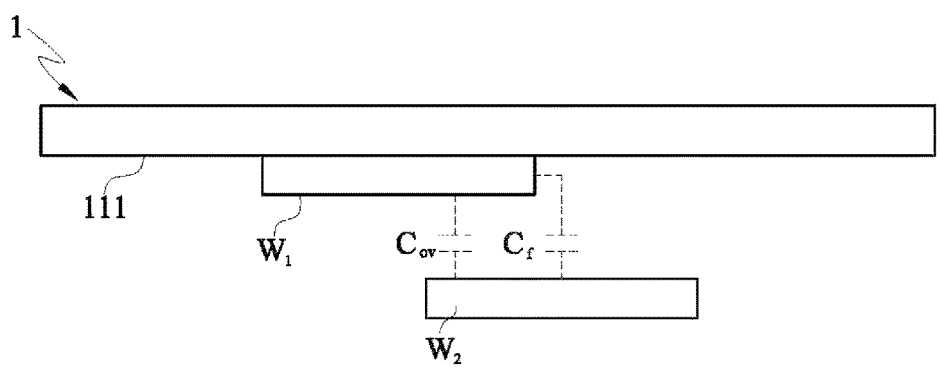
FIG. 15 is a diagram of at least one equivalent capacitance of the touch panel without being touched by the user according to an embodiment of the disclosure.
Figure 16:
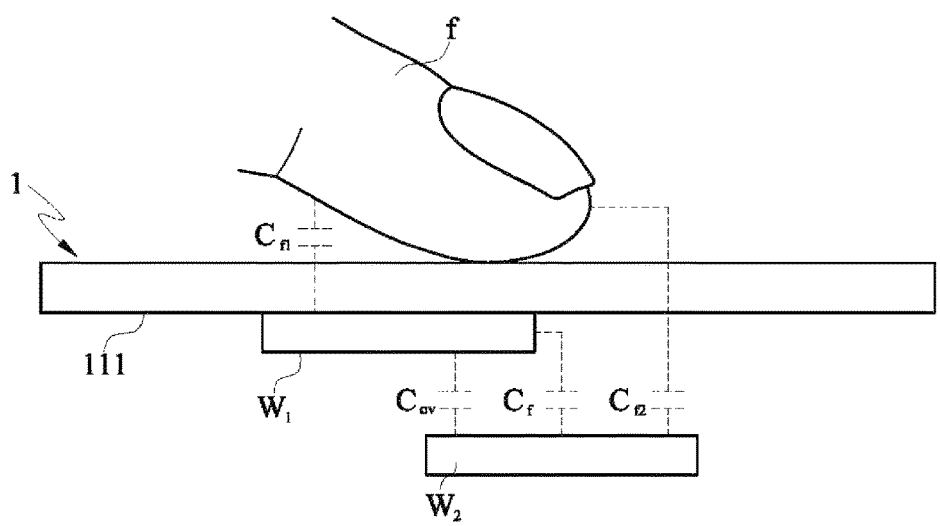
FIG. 16 is a diagram of an equivalent capacitance of the touch panel touched by the user according to at least one embodiment of the disclosure.

In association with the non-overlapping rule of the projection centroid of the plurality of overlapping areas of the plurality of conductive portions on the first transparent conductive wire and the plurality of overlapping areas of the plurality of conductive portions on the second transparent conductive wire, please refer to FIG. 15 and FIG. 16. FIG. 15 is a diagram of an equivalent capacitance of the touch panel without being touched by the user according to one or more embodiments of the disclosure. FIG. 16 is a diagram of an equivalent capacitance of the touch panel touched by the user according to one or more embodiments of the disclosure. As shown in FIG. 15, the touch panel 1 includes a substrate 111, a transparent conductive wire $W_1$ and a transparent conductive wire $W_2$. In one or more embodiments of the disclosure, the material of the substrate 111 is glass, poly methyl methacrylate (PMMA), poly vinyl chloride (PVC), polypropylene (PP), polyethylene terephthalate (PET), poly ethylene naphthalate (PEN), polycarbonate (PC), polystyrene (PS), or other transparent materials, without limitation thereto.

Generally, in order to simplify the explanation or computational complexity, the capacitance value between the two transparent conductive wires is approximately classified to an overlap capacitance $C_{ov}$ and a non-overlap capacitance $C_f$, wherein the capacitance value of the overlap capacitance $C_{ov}$ is related to the size of the overlapping areas between the transparent conductive wire $W_1$ and the transparent conductive wire $W_2$, the distance between the two transparent conductive wires $W_1$ and $W_2$, and the dielectric coefficient of the filler material between the two transparent conductive wires $W_1$ and $W_2$. The non-overlap capacitance $C_f$ is usually estimated from the fringing field effect/fringing effect. As shown in FIG. 16, when a user touches the substrate 111 of the touch panel 1, the space between the transparent conductive wire $W_1$ and the finger of the user is considered as an equivalent first capacitor $C_{f1}$, and the space between the transparent conductive wire $W_2$ and the finger of the user is considered as an equivalent second capacitor $C_{f2}$. In short, the capacitance value between the transparent conductive wire $W_1$ and the transparent conductive wire $W_2$ is considered as $C_{ov}+C_f+(C_{f1}C_{f2}/(C_{f1}+C_{f2}))$. Comparing with the condition in which the user's finger f does not touch the substrate 111, the difference of the capacitance value between the two transparent conductive wires $W_1$ and $W_2$ is $C_{f1}C_{f2}/(C_{f1}+C_{f2})$. The difference of the capacitance value contributed by the touch by the user's finger f is used for the processor 10 to determine that the touch by the user's finger f is correspondingly located at the intersection between the transparent conductive wire $W_1$ and the transparent conductive wire $W_2$.

Therefore, if the value of the overlap capacitance $C_{ov}$ is reduced, in the previous embodiment, the variation percentage of the capacitance value before/after the touch by the finger f can be increased, so that the sensitivity of the processor 10 is increased accordingly. In summary, the structure design of the transparent conductive wire in one or more embodiments of the disclosure is to make the overlap capacitance $C_{ov}$ as small as possible. When the projection centroids of the plurality of overlapping areas of the plurality of conductive portions on the first transparent conductive wire are not in the same position as the projection centroids of the plurality of overlapping areas of the plurality of conductive portions on the second transparent conductive wire, the overlap capacitance $C_{ov}$ is reduced and the sensitivity is increased accordingly.

According to the touch panel implemented by one or a plurality of embodiments, a mesh (palisade) conductive wire is provided. In association with the mesh (palisade) conductive wire in one or more embodiments of the disclosure, the area ratio of the overlapping part between the two layers of the conductive wire is reduced, so that the coupled capacitor created by the conductive wire overlapping is reduced accordingly, and the accuracy and sensitivity of the touch panel is increased.

In addition, according to the touch panel implemented by one or more embodiments of the disclosure, when a certain or some breaking points occur on the conductive wire during the usage, the impedance characteristic of the conductive wire is not significantly changed and the affection caused by the point defect on the accuracy and sensitivity of the touch panel is lowered accordingly.

The foregoing description has been presented for purposes of illustration. It is not exhaustive and does not limit the invention to the precise forms or embodiments disclosed. Modifications and adaptations will be apparent to those skilled in the art from consideration of the specification and practice of the disclosed embodiments of the invention. It is intended, therefore, that the specification and examples be considered as exemplary only, with a true scope and spirit of the invention being indicated by the following claims and their full scope of equivalents.

What is claimed is:

1. A touch panel, comprising:
a plurality of first transparent conductive wires of a first conductive layer, the first transparent conductive wire comprising:
a first conductive portion parallel to a first axis; and
a second conductive portion parallel to a second axis and intersecting with the first conductive portion in a first overlapping area, and the first transparent conductive wires are electrically insulating from each other; and
a plurality of second transparent conductive wires of a second conductive layer, the second conductive layer being disposed above the first conductive layer and the second transparent conductive wires are electrically insulating from each other, the second transparent conductive wire comprising:
a third conductive portion parallel to the first axis; and
a fourth conductive portion parallel to the second axis and intersecting with the third conductive portion in a second overlapping area, and the projection centroid of the first overlapping area being not in the same position as the projection centroid of the second overlapping area;
wherein the first transparent conductive wire further comprises:
a fifth conductive portion parallel to the first conductive portion and intersecting with the second conductive portion in a third overlapping area; and
a sixth conductive portion parallel to the second conductive portion, intersecting with the first conductive portion in a fourth overlapping area, and intersecting with the fifth conductive portion in a fifth overlapping area;
wherein a projection centroid of the third overlapping area, the projection centroid of the fourth overlapping area, the projection centroid of the fifth overlapping area and the projection centroid of the second overlapping area are all not in the same position.

2. The touch panel of claim 1, wherein the second transparent conductive wire further comprises:
a seventh conductive portion parallel to the second axis and intersecting with the third conductive portion in a sixth overlapping area;
an eighth conductive portion parallel to the second axis and intersecting with the third conductive portion in a seventh overlapping area;
a ninth conductive portion parallel to the first axis and intersecting with the seventh conductive portion in an eighth overlapping area, and intersecting with the eighth conductive portion in a ninth overlapping area; and
a tenth conductive portion parallel to the second axis and intersecting with the ninth conductive portion in a tenth overlapping area;
wherein the projection centroids of the overlapping areas belonging to the first transparent conductive wire are not in the same position as the projection centroids of the overlapping areas belonging to the second transparent conductive wire.

3. The touch panel of claim 1, wherein the material of the first transparent conductive wire and the second transparent conductive wire is metal oxide.

4. A touch panel, comprising:
a plurality of first transparent conductive wires of a first conductive layer, the plurality of first transparent conductive wires parallel to a first axis, each of the first transparent conductive wires, electrically insulating from each other, comprising:
a plurality of first sub conductive wires parallel to a second axis and in parallel with one another; and
a plurality of second sub conductive wires parallel to the first axis, in parallel one with another and intersecting with the plurality of first sub conductive wires in a plurality of overlapping areas; and
a plurality of second transparent conductive wires of a second conductive layer, the second conductive layer being disposed above the first conductive layer, the plurality of second transparent conductive wires parallel to the second axis, each of the second transparent conductive wires is electrically insulating from each other and has a plurality of hollow areas;
wherein at least part of the projection centroids of the overlapping areas are in the same position as part of the projection centroids of the hollow areas.

5. The touch panel of claim 4, wherein the projection centroid of each of the overlapping areas is in the same position as the projection centroid of one of the hollow areas.

6. The touch panel of claim 4, wherein the plurality of second transparent conductive wires have a first wire width and a second wire width, and the first wire width is larger than the second wire width.

7. The touch panel of claim 6, wherein the plurality of hollow areas are corresponding to the first wire width disposal.

8. The touch panel of claim 4, wherein the material of the first transparent conductive wire and the second transparent conductive wire is metal oxide.

9. The touch panel of claim 4, wherein each of the second transparent conductive wires comprises:
at least one hollow-shaped conductive portion; and
at lease one first conductive portion and at least one second conductive portion parallel to the second axis.

10. The touch panel of claim 9, wherein the hollow-shaped conductive portion has a first wire width; and
the first conductive portion and the second conductive portion have a second wire width;
wherein the first wire width is larger than the second wire width.

11. The touch panel of claim 9, wherein the hollow-shaped conductive portion comprises:
a third conductive portion and a fourth conductive portion in parallel each other and parallel to the first axis;
a fifth conductive portion and a sixth conductive portion in parallel each other and parallel to the second axis;
wherein the third conductive portion intersects with the first conductive portion and the fourth conductive portion intersects with the second conductive portion.

12. The touch panel of claim 4, wherein each of the second transparent conductive wires comprises a plurality of third sub conductive wires and two fourth sub conductive wires;
wherein the plurality of third sub conductive wires are in parallel one another and parallel to the first axis; and the two fourth sub conductive wires are in parallel each other, parallel to the second axis and intersects with the plurality of third sub conductive wires.

13. The touch panel of claim 4, wherein each of the plurality of sub conductive wires has at least two overlapping areas in different position.

* * * * *